(12) United States Patent
Lambourne

(10) Patent No.: US 11,828,415 B2
(45) Date of Patent: Nov. 28, 2023

(54) COMPOSITE GAS STORAGE TANK

(71) Applicant: ROLLS-ROYCE plc, London (GB)

(72) Inventor: Alexis Lambourne, Belper (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/398,174

(22) Filed: Aug. 10, 2021

(65) Prior Publication Data

US 2022/0065399 A1 Mar. 3, 2022

(30) Foreign Application Priority Data

Sep. 3, 2020 (GB) ...................................... 2013851

(51) Int. Cl.
*F17C 1/16* (2006.01)

(52) U.S. Cl.
CPC ........ *F17C 1/16* (2013.01); *F17C 2201/0109* (2013.01); *F17C 2203/0604* (2013.01);
(Continued)

(58) Field of Classification Search
CPC ................ F17C 1/16; F17C 2201/0109; F17C 2203/0604; F17C 2203/0619;
(Continued)

(56) References Cited

U.S. PATENT DOCUMENTS

| | | | | |
|---|---|---|---|---|
| 6,135,308 A | * | 10/2000 | Fang | ......................... F17C 1/06 220/601 |
| 7,870,971 B2 | * | 1/2011 | Schlag | .................... B29C 70/32 220/585 |

(Continued)

FOREIGN PATENT DOCUMENTS

| | | |
|---|---|---|
| EP | 3 128 221 A1 | 2/2017 |
| EP | 2 778 499 B1 | 3/2019 |

(Continued)

OTHER PUBLICATIONS

Feb. 1, 2021 Combined Search and Examination Report issued in British Patent Application No. 2013851.7.

(Continued)

*Primary Examiner* — John K Fristoe, Jr.
*Assistant Examiner* — Laura E. Parker
(74) *Attorney, Agent, or Firm* — Oliff PLC

(57) ABSTRACT

A composite gas storage tank includes a composite wall defining a main storage volume and a hollow conduit portion communicating with and extending away from the main storage volume. A hollow coupling element has a length portion which is partially embedded within and extends substantially parallel to the hollow conduit portion of the composite wall. The hollow conduit portion and the coupling element provide communication between the main storage volume and the tank exterior. A leakage path around the hollow coupling element is significantly longer than those of tanks of the prior art and reduces the rate at which hydrogen leaks from the tank. A carbon fibre filament winding extends over the length of the hollow conduit portion and provides a radially inwardly-directed force biasing the carbon fibre material of the hollow conduit portion into contact with the coupling element, further reducing the leakage rate on the leakage path.

10 Claims, 4 Drawing Sheets

(52) U.S. Cl.
CPC ............... *F17C 2203/066* (2013.01); *F17C 2203/0619* (2013.01); *F17C 2203/0663* (2013.01); *F17C 2221/012* (2013.01); *F17C 2223/036* (2013.01)

(58) Field of Classification Search
CPC ........ F17C 2203/066; F17C 2203/0663; F17C 2221/012; F17C 2223/036; F17C 2205/0305; F17C 13/04; F17C 2205/03; F17C 2205/0302; F17C 1/04; F17C 1/06; F17C 1/08; F17C 2203/012
USPC ........................................................ 220/586
See application file for complete search history.

(56) References Cited

U.S. PATENT DOCUMENTS

| | | | | |
|---|---|---|---|---|
| 8,096,441 | B2* | 1/2012 | Sato | F17C 1/06 |
| | | | | 220/582 |
| 2005/0087536 | A1* | 4/2005 | Caudill | F17C 1/14 |
| | | | | 220/586 |
| 2011/0108557 | A1 | 5/2011 | Tani et al. | |
| 2011/0284562 | A1* | 11/2011 | Novak | F16J 13/02 |
| | | | | 220/694 |
| 2014/0263366 | A1* | 9/2014 | Breuer | F16K 1/34 |
| | | | | 220/586 |
| 2016/0123532 | A1* | 5/2016 | Nakamura | F17C 1/02 |
| | | | | 220/586 |
| 2019/0152312 | A1* | 5/2019 | Park | B60K 15/03006 |
| 2020/0158286 | A1 | 5/2020 | Criel | |

FOREIGN PATENT DOCUMENTS

| | | | | |
|---|---|---|---|---|
| JP | | 5979446 B2 | 8/2016 | |
| WO | | 2015/197457 A1 | 12/2015 | |
| WO | | 2017/125098 A1 | 7/2017 | |
| WO | | 2020/002467 A1 | 1/2020 | |
| WO | | 2020/002467 A9 | 4/2020 | |
| WO | WO-2020264585 A1 * | | 12/2020 | ............... F16J 12/00 |

OTHER PUBLICATIONS

Jan. 28, 2022 Extended Search Report issued in European Patent Application No. 21189874.7.

* cited by examiner

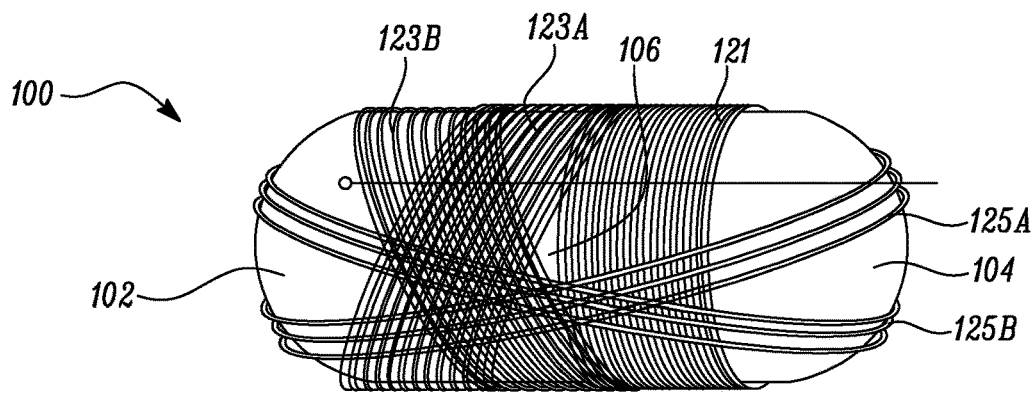
Prior Art
FIG. 1
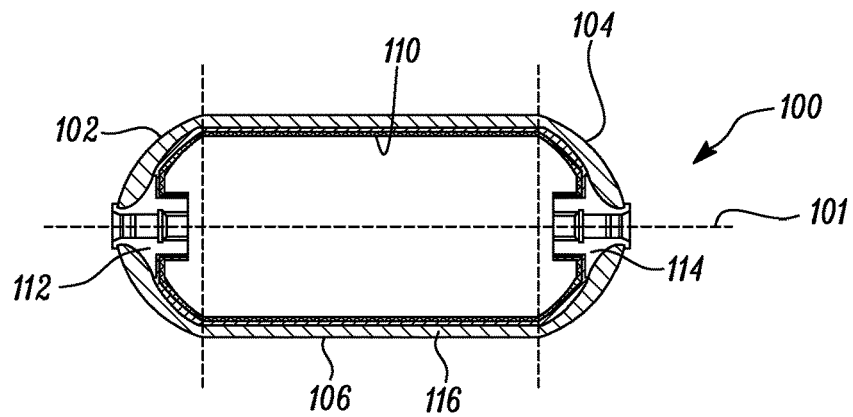
Prior Art
FIG. 2
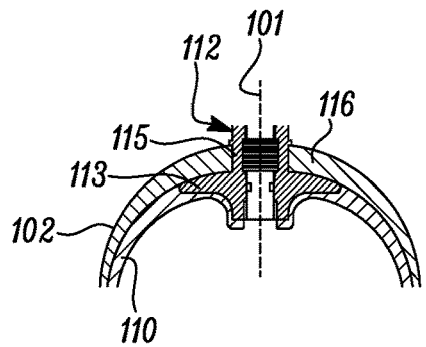 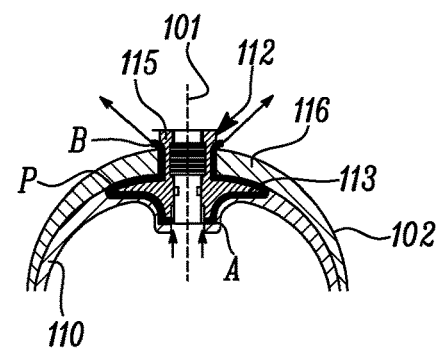
Prior Art
FIG. 3
Prior Art
FIG. 4

COMPOSITE GAS STORAGE TANK

CROSS-REFERENCE TO RELATED APPLICATIONS

This application is based upon and claims the benefit of priority from British Patent Application No. 2013851.7, filed on Sep. 3, 2020, the entire contents of which are herein incorporated by reference.

BACKGROUND OF THE INVENTION

Field of the Invention

The disclosure relates to composite gas storage tanks, particularly composite storage tanks for storing gaseous hydrogen at high pressure, for example 300 bar or greater.

Description of Related Art

Organic matrix composite storage tanks for storing gaseous hydrogen at high pressure are of interest for hydrogen-powered transport applications (road, rail, aerospace) in which motive power is provided by proton-exchange membrane (PEM) fuel cells. Motive power in aerospace applications could alternatively be provided by one or more hydrogen-burning gas turbine engines. Organic composite storage tanks are especially attractive for gaseous hydrogen storage in aerospace applications owing to their potential for achieving high gravimetric efficiencies of 10% or more.

A typical current state-of-the-art organic composite storage tank used in automotive applications comprises a composite wall with a polymer liner (i.e. a so-called 'Type IV' tank), and a metallic coupling for connecting the tank to a hydrogen fuel cell powertrain. The metallic coupling presents a particular problem as it needs to provide a transition from the polymer liner to metallic pipework external to the tank without giving rise to a significant leakage path for hydrogen stored within the tank. Although a leakage path can be increased in length by means of a metallic coupling having a flange element extending in a plane generally normal to the main body of the metallic coupling, nevertheless leakage around the metallic coupling represents a significant loss mechanism for hydrogen stored within the tank. A similar problem can arise in the case of a so-called 'Type V' tank, which is formed of an organic composite material but which does not have a polymer liner.

BRIEF SUMMARY OF THE INVENTION

According to an example, a composite gas storage tank comprises a composite wall defining a main storage volume and having a hollow conduit portion communicating with and extending away from the main storage volume, the composite gas storage tank further comprising a hollow coupling element, wherein a length portion of the hollow coupling element is embedded within and extends substantially parallel to the hollow conduit portion of the composite wall and the remainder of the length of the hollow coupling element extends beyond the end of the hollow conduit portion remote from the main storage volume, the hollow conduit portion and the hollow coupling element providing communication between the main storage volume and the exterior of the composite gas storage tank. A leakage path for gas stored within the tank exists within the hollow conduit portion of the composite wall, around the embedded length portion of the hollow coupling element. The leakage path is significantly longer than such paths within tanks of the prior art, thereby reducing the rate at which stored gas leaks from the composite gas storage tank.

The hollow conduit portion of the composite wall and the hollow coupling element may be substantially cylindrical and co-axial, providing for simple manufacture of the composite gas storage tank.

The composite gas storage tank may comprise a filament winding around the exterior of the hollow conduit portion of the composite wall, the winding providing a radially inwardly-directed force and extending over at least a part of the length of the hollow conduit portion which is axially coincident with the hollow coupling element. The material of the composite wall is thus biased against the hollow coupling element, further reducing the rate at which gas stored in the tank is lost via the leakage path around the hollow coupling element.

At least a portion of the internal and external surfaces of the length portion of the hollow coupling element which is embedded within the hollow conduit portion of the composite wall may be provided with one or more geometric surface features to further increase the length of the leakage path and further reduce the rate at which stored gas is lost from the composite gas storage tank via the leakage path. The geometric surface features may comprise one or more threads, barbs or curves.

The composite gas storage tank may comprise a polymer liner on the interior surface of the composite wall to further reduce leakage of stored gas through the composite wall.

The hollow conduit portion of the composite wall and the hollow coupling element may each have the form of a truncated cone, or may each be curved.

BRIEF DESCRIPTION OF THE SEVERAL VIEWS OF THE DRAWINGS

Examples are described below with reference to the accompanying drawings in which:

FIG. 1 shows an external view of an organic composite hydrogen storage tank of the prior art;

FIG. 2 shows a longitudinal section through the FIG. 1 tank;

FIG. 3 shows a longitudinal section of the FIG. 1 tank in the vicinity of a metallic coupling of the tank;

FIG. 4 shows a longitudinal section of the FIG. 1 tank in the vicinity of a metallic coupling of the tank and indicates a hydrogen leakage path;

DETAILED DESCRIPTION OF THE INVENTION

Figure 5:
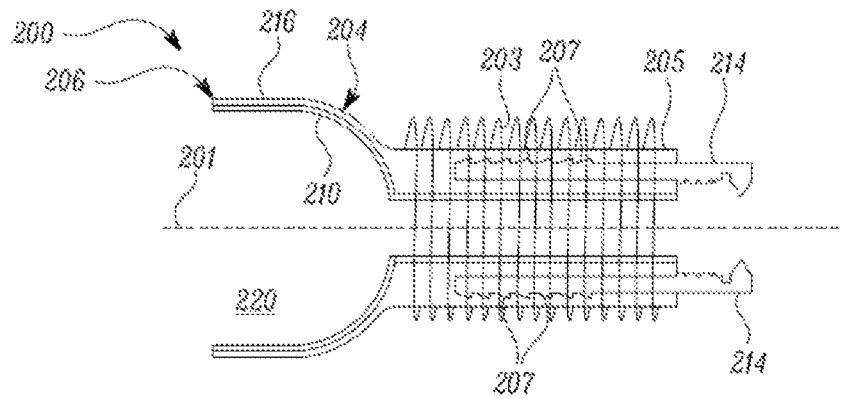
FIG. 5 shows a longitudinal section of a first example composite gas storage tank in the vicinity of a metallic coupling element comprised in the tank.

Referring to FIGS. 1 to 4, an organic composite hydrogen storage tank 100 of the prior art comprises a hollow cylindrical central section 106 formed integrally with two hollow hemispherical end portions 102, 104. The tank 100 has a central longitudinal axis 101. Hoop strength is provided to the hollow cylindrical central section 106 by a helical hoop winding 121 comprising organic fibre, the planes of individual windings being perpendicular to the central longitudinal axis 101 of the hollow cylindrical central portion 106. Axial strength is provided to the hollow cylindrical central section 106 by high-angle, helical windings 123A, 123B of organic fibre, the planes of individual windings being inclined at around +/−50° to the longitudinal axis of the tank 100. Low-angle windings 125A, 125B add strength to the hemispherical end portions 102, 104, the planes of individual windings of the low-angle windings 125A, 125B being inclined at a small angle to the longitudinal axis of the cylindrical section 106. The tank 100 comprises an organic composite wall 116 which is lined on its interior with a polymer liner 110 (e.g. polyethylene or polypropylene) to mitigate leakage of hydrogen gas from the tank 100 through the composite wall 116, i.e. the tank 100 is a so-called 'Type IV' tank.

End portions 102, 104 are each provided with a respective metal coupling element 112, 114 which passes through both the composite main wall 116 and the polymer liner 110. FIGS. 3 and 4 each show a detailed view of end portion 102 including metal coupling element 112. The metal coupling element 112 has a flange portion 113 extending generally normal to a cylindrical portion 115 or main body which couples the interior of the tank 100 to the exterior. The flange portion 113 occupies a space between the liner 110 and the composite wall 116. The flange portion 113 of the metal coupling element 112 provides a leakage path P from an ingress point A in the interior of the tank 100 to an egress point B on the exterior of the tank 100, the leakage path P being extended in length compared to that achievable using a metallic coupling element in the form of a simple hollow cylinder. Although the form of the leakage path P reduces leakage of hydrogen gas compared to that of a tank having a cylindrical metallic coupling, but which is otherwise identical to the tank 100, the leakage path P nevertheless represents a significant leakage mechanism. Furthermore, leakage via the path P increases significantly as the pressure of gaseous hydrogen stored within the tank 100 increases.

Figure 6:
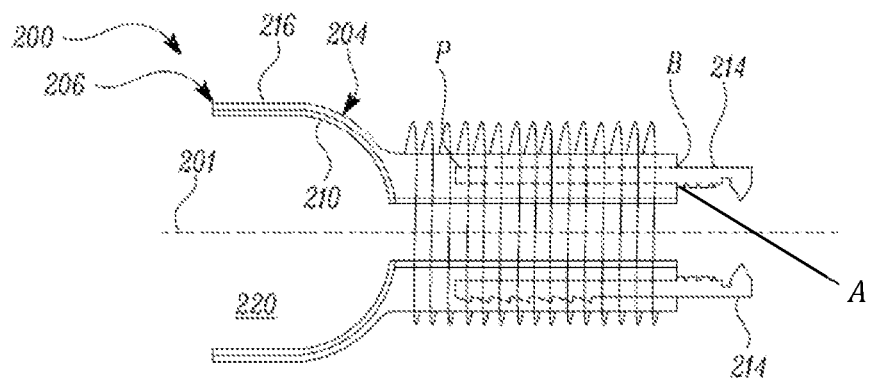
FIG. 6 shows a longitudinal section of the first example tank in the vicinity of a metallic coupling element comprised in the tank and indicates a hydrogen leakage path.
Figure 7:
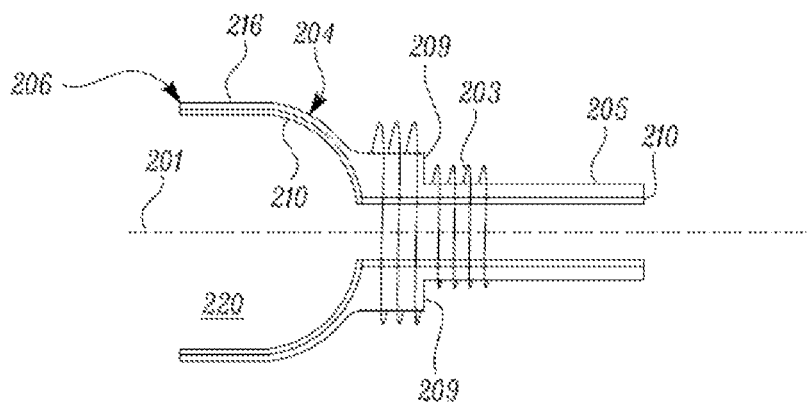
FIG. 7 shows a first step in the fabrication of the tank of FIG. 5.

Referring to FIGS. 5 and 6, a first example composite gas storage tank 200 comprises a cylindrical central portion 206 formed integrally with a domed or hemispherical end portion 204. The tank 200 has a central longitudinal axis 201 and is formed of a composite wall 216 having a polymer liner 210. The composite wall 216 defines a main storage volume 220 and a hollow cylindrical conduit portion 205 extending from the end portion 204 away from the main storage volume 220 and communicating with the main storage volume 220. The polymer liner 210 also extends to line the interior of the hollow cylindrical conduit portion 205. A metallic hollow cylindrical coupling element 214 is co-axial with, and partially embedded within, the hollow cylindrical conduit portion 205 of the composite wall 216. A length portion of the of the hollow cylindrical coupling element 214 is embedded within and extends substantially parallel to the hollow cylindrical conduit portion 205 of the composite wall 216; the remainder of the length of the hollow cylindrical coupling element 214 extends from the end of the hollow conduit portion 205 remote from the main storage volume 220. A composite filament winding 203 is wound around the hollow cylindrical conduit portion 205; this may be a dedicated winding or alternatively an extension of a low- or high-angle winding provided on the end portion 204 or the cylindrical central portion 206 of the tank 200. The winding 203 is under tension and provides a force around the periphery of the hollow cylindrical conduit portion 205 which is directed radially inwardly towards the axis 201. The external surface of the metallic hollow cylindrical coupling element 214 has geometric surface features in the form of barbs 207.

Referring specifically to FIG. 6, a leakage path P for gaseous hydrogen stored within the tank 200 extends from an ingress point A on the internal surface of the coupling element 214 to an egress point B on the exterior surface of the coupling element 214 along a path P. Since the coupling element 214 and the hollow conduit portion 205 of the composite wall 216 are generally parallel, the leakage path P is much longer than that of the tank 100 of FIGS. 1 to 4. The presence of the barbs 207 further increases the length of the leakage path P compared to the leakage path of the tank 100 of FIGS. 1 to 4. The compressive force provided by the composite filament winding 203 tends to bias the hollow cylindrical conduit portion 205 of the composite shell 216 against the exterior surface of the coupling element 214, thus providing a partial seal and reducing the rate at which hydrogen escapes from the tank 200 via the leakage path P.

FIGS. 7 to 10 show stages in the fabrication of the hollow conduit portion 205 of the composite wall 216 and the embedding of the metallic coupling element 214 within the hollow conduit portion 205. In a first step, shown in FIG. 7, the polymer liner 210 for the hollow conduit portion 205 is manufactured by an appropriate technique, such as rotational moulding and carbon fibre is filament-wound over the liner 210. As the carbon fibre filament winding 203 moves from the hollow conduit portion 205 towards the end portion 204 of the tank 200, it undergoes a diameter change to produce a step 209 to accommodate the hollow cylindrical coupling element 214.

Figure 8:
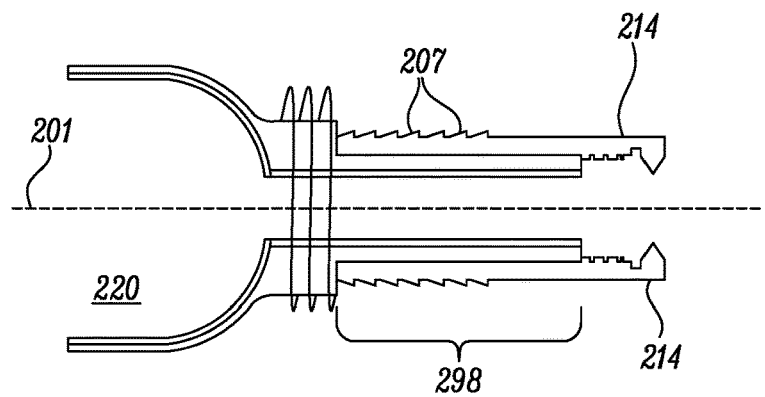
FIG. 8 shows a second step in the fabrication of the tank of FIG. 5.

In a second step, the hollow coupling element 214 is sleeved over the lower-diameter portion of the part-formed hollow conduit portion 205 on a side of the step 209 remote from end portion 204 of the tank 100, as shown in FIG. 8. The inner surface of the coupling element 214 gives an interference fit with the carbon fibre of the part-formed elongate hollow conduit portion 205 over the region 298. The coupling element 214 may have additional features to increase bonding to the carbon fibre of the hollow conduit portion 205, for example a chemical pre-treatment, barbs, machined grooves, a grit-blasted surface or a defined surface roughness.

Figure 9:
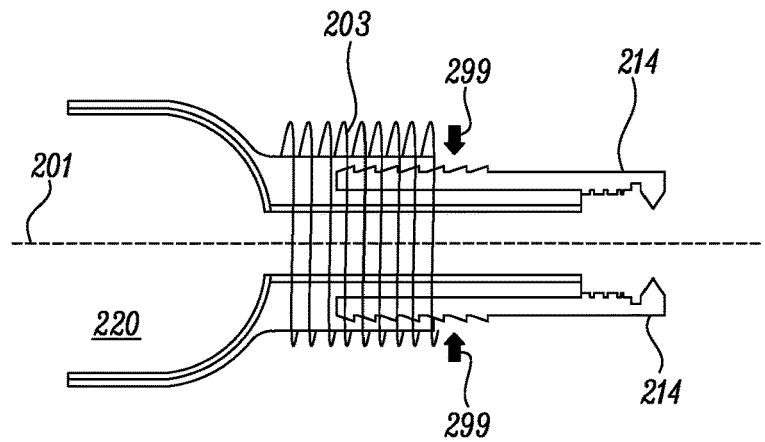
FIG. 9 shows a third step in the fabrication of the tank of FIG. 5.

Once the coupling element 214 is in place, carbon fibre filament winding recommences over the coupling element 214. Filament winding in the region 298 is carried out with a pre-stress which improves interfacial adhesion between the hollow cylindrical coupling element 214 and the carbon fibre of the conduit portion 205 (FIG. 9). The pre-stress in the carbon fibre filament winding results in a force, indicated by arrows 299, which is directed radially inwardly towards the central longitudinal axis 201 of the tank 200.

Figure 10:
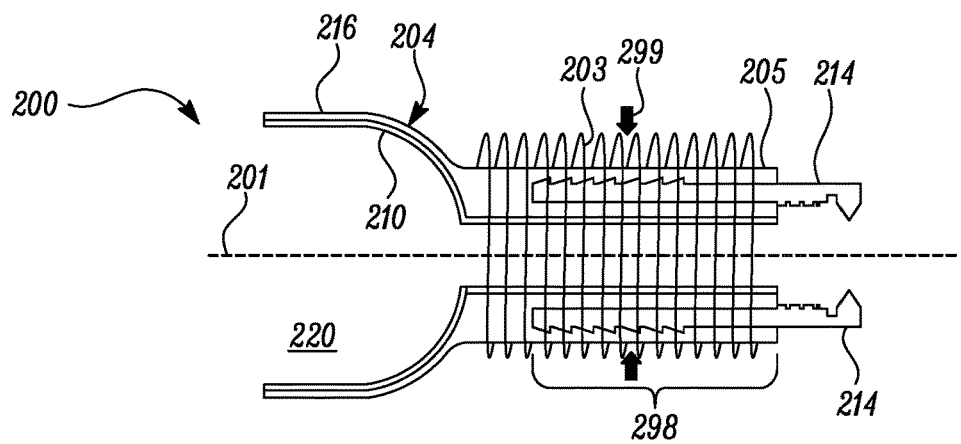
FIG. 10 shows a fourth step in the fabrication of the tank of FIG. 5.

Referring to FIG. 10, carbon fibre filament winding is completed such that there is a co-continuous carbon fibre overwrap from the end portion 204 throughout the region 298 with a pre-tension in the carbon fibre filament winding. The tank 200 is then thermally cured by an autoclave or similar process, ensuring good adhesion between the carbon fibre and the coupling element 214. The tank 200 is then complete and ready for interconnection with a fuel system via the hollow cylindrical coupling element 214 and the hollow conduit portion 205.

A good adhesive bond is provided between the carbon fibre of the hollow conduit region 205 and the hollow coupling element 214, and a long leakage path for hydrogen escaping the tank 200 around the coupling element 214 is achieved. The process of embedding the coupling element 214 within the composite wall 216 of the hollow conduit region 205 is simple to carry out. Pre-stress in the carbon fibre filament winding ensures a good bond with the hollow coupling element 214. The degree of pre-tension may be adjusted to suit a particular application, for example for different tank pressures. The approach illustrated with reference to FIGS. 7 to 10 is low-cost and scalable.

Bonding between the hollow coupling element 214 and the carbon fibre may be improved by altering the surface finish of the element 214 (e.g. roughness, specific surface area etc) or by altering its surface chemistry for example by provision of an oxide conversion coating or anodising.

Another example composite gas storage tank is like to the tank 200 of FIGS. 5 and 10, but does not comprise a polymer liner, i.e. it is a Type V tank.

Figure 11:
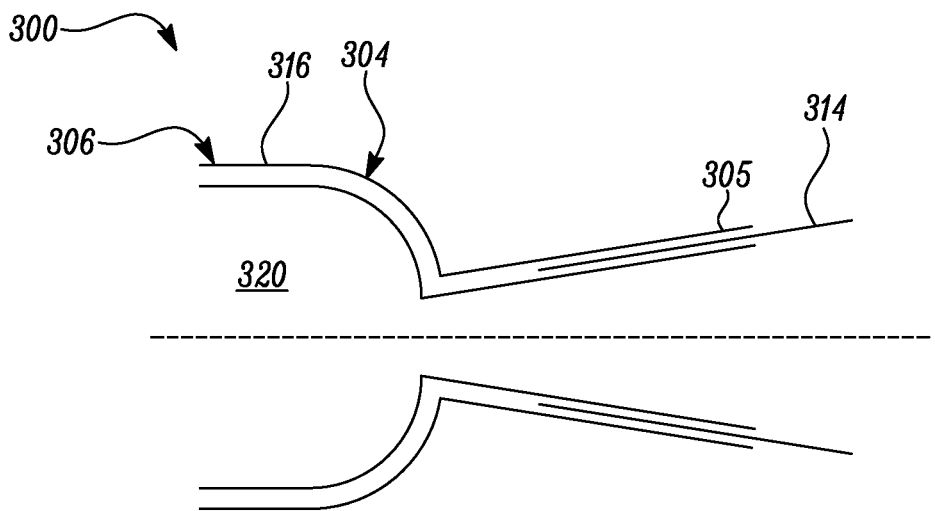
FIG. 11 shows a longitudinal section of a second example composite gas storage tank.

Referring to FIG. 11, a second example composite gas storage tank 300 comprises a composite wall 316 defining a main gas storage volume 320 and a hollow conduit portion 305 in the form of a hollow truncated cone extending away from the main storage volume 320. The composite wall 316 defines a cylindrical central portion 306 and a hemispherical end portion 304 of the tank 300. A hollow metallic coupling element 314, also in the form of a hollow truncated cone has a portion of its length embedded within the hollow conduit portion 305 of the composite wall 316, the remainder of its length extending from the end of the hollow conduit portion 305 remote from the main storage volume 320. The elongate hollow conduit portion 305 and the hollow coupling element 314 provide communication between the main storage volume 320 and the exterior of the tank 300.

Figure 12:
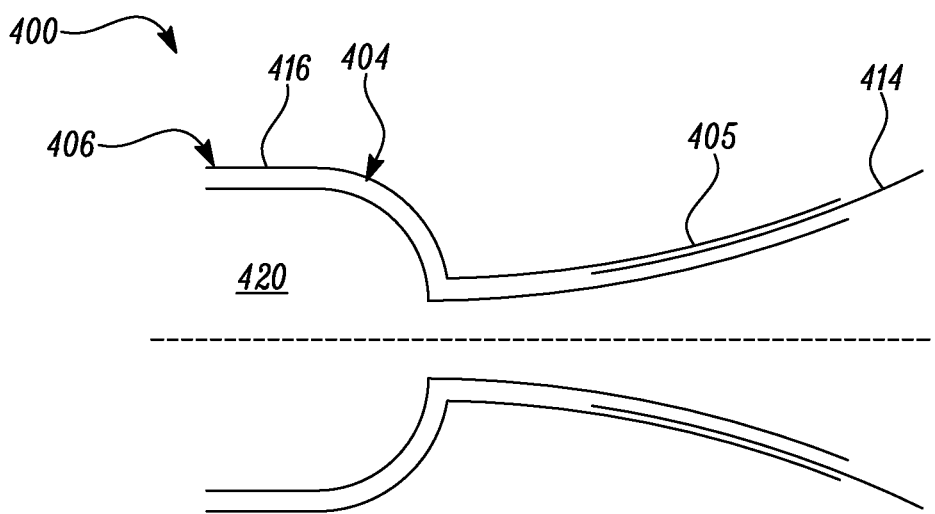
FIG. 12 shows a longitudinal section of a third example composite gas storage tank.

Referring to FIG. 12, a third example composite gas storage tank 400 comprises a composite wall 416 defining a main gas storage volume 420 and a hollow conduit portion 405 which extends away from the main storage volume 420 and which has a curved surface. The composite wall 416 defines a cylindrical central portion 406 and a hemispherical end portion 404 of the tank 400. A hollow coupling element 414, which also has a curved surface, has a portion of its length embedded within the hollow conduit portion 405 of the composite wall 416, the remainder of its length extending from the end of the hollow conduit portion 405 remote from the main storage volume 420. The hollow conduit portion 405 and the hollow coupling element 414 provide communication between the main storage volume 420 and the exterior of the tank 400. The hollow coupling element 414 may be metallic.

What is claimed is:

1. A composite gas storage tank comprising:
   a composite wall defining a main storage volume and a hollow conduit portion communicating with and extending away from the main storage volume; and
   a hollow coupling element, the hollow coupling element and the hollow conduit portion providing communication between the main storage volume and an exterior of the composite gas storage tank,
   wherein a length portion of the hollow coupling element is embedded within a composite material of the hollow conduit portion of the composite wall and extends substantially parallel to the hollow conduit portion of the composite wall,
   a remainder of a length of the hollow coupling element extends beyond the end of the hollow conduit portion remote from the main storage volume, and
   the length portion of the hollow coupling element is completely embedded within the composite material of the hollow conduit portion of the composite wall, such that internal and external surfaces of the length portion of the hollow coupling element in a radial direction relative to an axis of the gas storage tank are both in contact with the composite material of the hollow conduit portion of the composite wall.

2. A composite gas storage tank according to claim 1 wherein the hollow conduit portion of the composite wall and the hollow coupling element are substantially cylindrical and co-axial.

3. A composite gas storage tank according to claim 2 comprising a filament winding around the exterior of the hollow conduit portion of the composite wall, the winding providing a radially inwardly-directed force and extending over at least a part of the length of the hollow conduit portion which is axially coincident with the hollow coupling element.

4. A composite gas storage tank according to claim 2 wherein at least a portion of an external surface of the length portion of the hollow coupling element which is embedded within the hollow conduit portion of the composite wall is provided with one or more geometric surface features.

5. A composite gas storage tank according to claim 4 wherein the one or more geometric surface features comprise one or more threads, barbs or curves.

6. A composite gas storage tank according to claim 1 and comprising a polymer liner on the interior surface of the composite wall.

7. A composite gas storage tank according to claim 1 wherein the hollow conduit portion of the composite wall and the hollow coupling element each have the form of a truncated cone.

8. A composite gas storage tank according to claim 1 wherein the hollow conduit portion of the composite wall and the hollow coupling element are each curved.

9. A composite gas storage tank according to claim 3 wherein at least a portion of an external surface of the length portion of the hollow coupling element which is embedded within the hollow conduit portion of the composite wall is provided with one or more geometric surface features.

10. A composite gas storage tank according to claim 9 wherein the one or more geometric surface features comprise one or more threads, barbs or curves.

* * * * *